United States Patent Office 3,074,954
Patented Jan. 22, 1963

3,074,954
HETEROCYCLIC COMPOUNDS
Justus Kenneth Landquist, Macclesfield, England, assignor to Imperial Chemical Industries Limited, London, England, a corporation of Great Britain
No Drawing. Filed Jan. 18, 1961, Ser. No. 83,385
Claims priority, application Great Britain Feb. 1, 1960
2 Claims. (Cl. 260—294.8)

This invention relates to heterocyclic compounds and more particularly it relates to new thiazole derivatives which possess therapeutic properties.

According to the invention I provide thiazole derivatives of the formula:

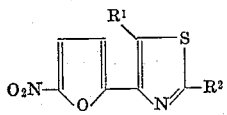

wherein $R^1$ stands for hydrogen or a hydrocarbon radical, and wherein $R^2$ stands for an amino, hydrocarbon or heterocyclic radical, any of which may optionally be substituted, and the acid-addition and quaternary salts thereof of the formula:

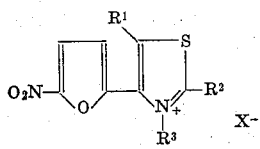

wherein $R^1$ and $R^2$ have the meanings stated above, wherein $R^3$ stands for hydrogen or an alkyl radical of from 1 to 5 carbon atoms, and wherein $X^-$ stands for an anion.

As a suitable value for $R^1$ there may be mentioned, for example, an alkyl radical, for example an alkyl radical of not more than 5 carbon atoms, for example the methyl radical. As a suitable value for $R^2$ when it stands for a substituted amino radical there may be mentioned, for example, an alkylamino radical, for example an alkylamino radical of not more than 5 carbon atoms, for example the methylamino radical, or a dialklamino radical, for example a dialkylamino radical of not more than 10 carbon atoms, for example the dimethylamino radical, or a dialkylaminoalkylamino radical, for example a dialkylaminoalkylamino radical of not more than 10 carbon atoms, for example the 2-diethylaminoethylamino radical, or a pyridylamino radical, for example the 2-pyridylamino radical, or the guanidino radical. As other suitable values for $R^2$ there may be mentioned, for example, the phenyl radical, optionally substituted, for example a dialkylaminophenyl radical, for example a dialkylaminophenyl radical containing not more than 16 carbon atoms, for example the p-dimethylaminophenyl radical. As other suitable values for $R^2$ there may be mentioned, for example, the 2-, 3- or 4-pyridyl radical, optionally substituted, for example an alkylpyridyl or dialkylpyridyl radical, for example an alkylpyridyl or dialkylpyridyl radical wherein the alkyl radical or radicals each contain not more than 5 carbon atoms, for example a methylpyridyl or dimethylpyridyl radical, or a halogenopyridyl radical, for example a chloropyridyl radical, or a hydroxy-(alkyl)pyridyl radical, for example a hydroxy-(alkyl)pyridyl radical wherein the alkyl radical contains not more than 5 carbon atoms, for example a hydroxy-(methyl)pyridyl radical. As suitable values for $R^3$ there may be mentioned, for example, the methyl or ethyl radical. As suitable values for $X^-$ there may be mentioned, for example, non-toxic anions derived from inorganic acids, for example hydrochloric, hydrobromic, hydriodic or sulphuric acid, or anions derived from organic acids, for example acetic acid.

Preferred compounds of the present invention are 2-amino-4-(5-nitro-2-furyl)thiazole, 2-dimethylamino-4-(5-nitro-2-furyl)thiazole, and 4-(5-nitro - 2 - furyl)-2-(3-pyridyl)thiazole, and the acid-addition salts thereof.

It is to be understood that the salts of those of the thiazole derivatives of the invention wherein $R^2$ stands for the amino radical or a mono-substituted amino radical, and wherein $R^3$ stands for an alkyl radical of from 1 to 5 carbon atoms, may be regarded as salts of 3-alkyl-2-imino-2,3-dihydrothiazole derivatives.

According to a further feature of the invention I provide a process for the manufacture of said thiazole derivatives which comprises the interaction of a keto- compound of the formula:

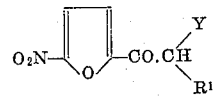

wherein Y stands for a halogen atom, for example the chlorine or bromine atom, and wherein $R^1$ has the meaning stated above, with a thioamide derivative of the formula $R^2.CS.NHR^3$ wherein $R^2$ and $R^3$ have the meanings stated above.

As suitable thioamide compounds there may be mentioned, for example, thiourea, mono- and dialkylthioureas, thiobenzamide, substituted thiobenzamides, and thionicotinamide.

The said interaction may conveniently be carried out in an inert diluent or solvent, for example ethanol, and it is preferably carried out at an elevated temperature, for example a temperature between 80° C. and 100° C.

The said keto-compound used as starting material may be obtained by the action of hydrogen halides on the diazoketones obtained from 5-nitrofuroyl chloride and diazoalkanes, or by halogenating 5-nitrofuryl alkyl ketones in an acid medium, for example by bromination in acetic acid or aqueous hydrobromic acid.

The said acid-addition salts and quaternary salts may be manufactured according to the process described above, or they may be obtained by the interaction of the said thiazole derivative, in the form of the free base, with an inorganic or organic acid, or with an ester of an aliphatic alcohol of 1 to 5 carbon atoms with an inorganic or strong organic acid, for example methyl iodide or methyl p-toluenesulphonate.

According to a further feature of the invention I provide a process for the manufacture of the said thiazole derivatives which comprises the nitration of furylthiazole derivatives of the formulae:

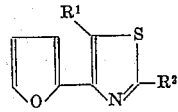

or

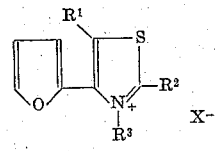

wherein $R^1$, $R^2$, $R^3$ and $X^-$ have the meanings stated above.

The said nitration may conveniently be carried out by the use of an acyl nitrate, for example an acyl nitrate of not more than 7 carbon atoms, for example acetyl nitrate or benzoyl nitrate, preferably in solution in the corresponding acid anhydride. Thus the said nitration may be carried out by the use of acetyl nitrate in acetic anhydride. The said nitration may conveniently be carried out at a temperature between −10° C. and 20° C. The said nitration affords an intermediate which may be converted to the said thiazole derivative by reaction thereof with a base, for example an organic base containing not more than 8 carbon atoms, for example pyridine.

As stated above, the said thiazole derivatives possess therapeutic properties, thus they possess useful antibacterial and antiprotozoal activity.

The invention is illustrated but not limited by the following examples in which the parts are by weight:

*Example 1*

7.6 parts of thiourea are dissolved in 250 parts of ethanol and 19 parts of 5-nitro-2-furyl chloromethyl ketone are added. The mixture is heated under reflux during one hour and most of the solvent is evaporated at 100° C. Crystallisation of the residue occurs slowly on standing, and it may be facilitated by stirring with a small volume of ethyl acetate. The mixture is filtered and the solid residue is crystallised from ethanol. There is thus obtained 2-amino-4-(5-nitro-2-furyl)thiazole hydrochloride, M.P. 212–214° C. By addition of a saturated aqueous solution of sodium acetate to an aqueous solution of the hydrochloride the corresponding free base is obtained as an orange solid, M.P. 239° C.

5-nitro-2-furyl chloromethyl ketone may be obtained as follows:

Dry hydrogen chloride gas is passed into a solution of 5-nitro-2-furyl diazomethylketone in ether until no further bubbles of nitrogen are seen to be evolved from the mixture. The ether is then evaporated and the residue is crystallised from light petroleum (B.P. 100–120° C.). There is thus obtained 5-nitro-2-furyl chloromethyl ketone, M.P. 89–90° C.

*Example 2*

9 parts of methyl thiourea are dissolved in 250 parts of hot ethanol and 19 parts of 5-nitro-2-furyl chloromethyl ketone are slowly added. When the exothermic reaction has subsided the mixture is heated under reflux during 1 hour and then cooled. 2-methylamino-4-(5-nitro - 2-furyl)thiazole hydrochloride, M.P. 186–188° C., crystallises out and is isolated by filtration. The corresponding free base, M.P. 200–201° C., is obtained by treatment of an aqueous solution of the hydrochloride with sodium acetate solution, followed by filtration of the mixture and drying of the solid residue.

*Example 3*

11 parts of N,N-dimethylthiourea, 250 parts of ethanol and 19 parts of 5-nitro-2-furyl chloromethyl ketone are heated under reflux during 1.5 hours. The mixture is cooled and filtered and the solid residue is crystallised from ethanol. There is thus obtained 2-dimethylamino-4-(5-nitro - 2 - furyl)thiazole as orange needles, M.P. 168° C.

*Example 4*

11 parts of N,N¹-dimethylthiourea, 250 parts of ethanol and 19 parts of 5-nitro-2-furyl chloromethyl ketone are heated under reflux during 1 hour. The mixture is then evaporated at 100° C. until crystallisation begins, and is then set aside until crystallisation is completed. The mixture is filtered and the solid residue is crystallised from ethanol. There is thus obtained 3-methyl-2-methylimino-4-(5-nitro-2-furyl)-2,3-dihydrothiazole hydrochloride, M.P. 236–237° C.

*Example 5*

11.8 parts of guanylthiourea are dissolved in 250 parts of hot ethanol and 19 parts of 5-nitro-2-furyl chloromethyl ketone are added. The mixture is heated under reflux during 1 hour, 15 parts of concentrated hydrochloric acid are added and the mixture is stood at 20° C. during several hours. The mixture is filtered and the solid residue is dissolved in hot 2-ethoxyethanol. Concentrated hydrochloric acid is added to the solution and the resultant mixture is filtered. The solid residue is 2-guanidino-4-(5-nitro-2-furyl)thiazole hydrochloride, M.P. 246–247° C., which is converted to the acetate, M.P. 220° C., by treatment of an aqueous solution thereof with sodium acetate.

*Example 6*

18 parts of p-dimethylaminothiobenzamide are dissolved in a mixture of 1,000 parts of aqueous ethanol (50% by volume) and 25 parts of concentrated hydrochloric acid. The solution is heated and 19 parts of 5-nitro-2-furyl chloromethyl ketone are added. The mixture is heated under reflux during 1 hour. The mixture is cooled and filtered and the solid residue is crystallised from 2-ethoxyethanol. There is thus obtained 2-p-dimethylaminophenyl-4-(5-nitro-2-furyl)thiazole, M.P. 205° C.

*Example 7*

17.5 parts of 2-dimethylaminoethylthiourea, 19 parts of 5-nitro-2-furyl chloromethyl ketone and 250 parts of ethanol are heated under reflux during 1 hour. The mixture is cooled and filtered; the solid residue is retained and the filtrate is evaporated to a low volume, cooled, and filtered. The combined solid residues are crystallised from ethanol and there is thus obtained 2-(2-diethylaminoethylamino)-4-(5-nitro-2 - furyl)thiazole hydrochloride, M.P. 198–200° C.

*Example 8*

14 parts of thionicotinamide, 19 parts of 5-nitro-2-furyl chloromethyl ketone and 250 parts of ethanol are heated under reflux during 1 hour. The solution is cooled and filtered. The solid residue is the hydrochloride of 4-(5-nitro-2-furyl)-2-(3-pyridyl)thiazole, M.P. 169° C. This hydrochloride is crystallised from ethanol with the addition of sodium acetate, and there is thus obtained the corresponding free base, M.P. 174° C.

In a similar manner, using 23.4 parts of 5-nitro-2-furyl bromomethyl ketone in place of the 19 parts of 5-nitro-2-furyl chloromethyl ketone, there is obtained the hydrobromide of 4 - (5-nitro-2-furyl)-2-(3-pyridyl)thiazole, M.P. 220° C.

*Example 9*

A mixture of 14 parts of thioisonicotinamide, 19 parts of 5-nitro-2-furyl chloromethyl ketone and 250 parts of ethanol is heated under reflux for 2 hours, and the solution is then evaporated until crystallisation begins. The mixture is stirred with 40 parts of ethyl acetate, and filtered. The solid residue is crystallised from 2 N hydrochloric acid, giving 4-(5-nitro-2-furyl)-2-(4-pyridyl)thiazole hydrochloride, M.P. 250–252° C.

In a similar manner, using 16.6 parts of 2,6-dimethylthionicotinamide in place of the 14 parts of thioisonicotinamide, there is obtained 2-(2,6-dimethyl-3-pyridyl)-4-(5-nitro-2-furyl)-thiazole hydrochloride, M.P. 248–249° C.

The 2,6-dimethylthionicotinamide used as starting material may be obtained as follows:

27 parts of 3-cyano-2,6-dimethylpyridine are dissolved in 300 parts of ethanolic ammonia. The solution is saturated with hydrogen sulphide at 0° C., and kept at ambient temperature for 2 days. The mixture is filtered, and the solid residue is crystallised from ethanol, giving 2,6-dimethylthionicotinamide, M.P. 202–204° C.

In a similar manner to that described above for the preparation of 4-(5-nitro-2-furyl)-2-(4-pyridyl)thiazole hydrochloride, using 16.6 parts of 4,6-dimethylthionicotinamide in place of the 14 parts of thioisonicotinamide, there is obtained 2-(4,6-dimethyl-3-pyridyl)-4-(5-nitro-2-furyl)thiazole hydrochloride, M.P. 222–224° C. The free base has M.P. 190° C. (from ethanol).

The 4,6-dimethylthionicotinamide, M.P. 208–209° C., used as starting material, may be obtained from 3-cyano-4,6-dimethylpyridine in a similar manner to that described above for the preparation of 2,6-dimethylthionicotinamide.

Example 10

7 parts of thiopicolinamide, 12 parts of 5-nitro-2-furyl bromomethyl ketone, and 150 parts of ethanol are heated under reflux for 1 hour. The mixture is cooled and filtered, and the solid residue is washed with ethanol. There is thus obtained 4-(5-nitro-2-furyl)-2-(2-pyridyl)thiazole, M.P. 216–217° C.

Example 11

17.3 parts of 2-chlorothioisonicotinamide, 19 parts of 5-nitro-2-furyl chloromethyl ketone and 750 parts of ethanol are heated under reflux for 1 hour and the solution is concentrated until crystallisation occurs. The mixture is cooled and filtered, and the solid residue is crystallised from ethanol giving 2-(2-chloro-4-pyridyl)-4-(5-nitro-2-furyl)thiazole, M.P. 212–214° C.

In a similar manner, using 16.4 parts of 2-hydroxy-6-methylthionicotinamide in place of the 17.3 parts of 2-chlorothioisonicotinamide, there is obtained 2-(2-hydroxy-6-methyl-3-pyridyl)-4-(5-nitro-2-furyl)thiazole, M.P. 336–337° C.

The 2-hydroxy-6-methylthionicotinamide used as starting material may be obtained as follows:

2.5 parts of 3-cyano-2-hydroxy-6-methylpyridine and 50 parts of ethanolic ammonia are saturated with hydrogen sulphide at 0° C., and the mixture is heated in a pressure vessel at 120° C. for 6 hours. The mixture is cooled and filtered, and the solid residue is washed with hot benzene. There is thus obtained 2-hydroxy-6-methylthionicotinamide, M.P. 247–249° C.

Example 12

15.3 parts of 2-pyridylthiourea, 19 parts of 5-nitro-2-furyl chloromethyl ketone, and 250 parts of ethanol are heated under reflux for 1 hour. The mixture is cooled and filtered. The solid residue is crystallised from 2 N hydrochloric acid giving 4-(5-nitro-2-furyl)-2-(2-pyridylamino)thiazole hydrochloride, M.P. 247–249° C.

Example 13

7.5 parts of thioacetamide, 19 parts of 5-nitro-2-furyl chloromethyl ketone, and 250 parts of ethanol are heated under reflux for 1.5 hours. The mixture is cooled and filtered. The solid residue is 2-methyl-4-(5-nitro-2-furyl)thiazole, M.P. 144–145° C.

In a similar manner, using 14 parts of thiobenzamide in place of the 7.5 parts of thioacetamide, there is obtained 4-(5-nitro-2-furyl)-2-phenylthiazole, M.P. 184–185° C.

Example 14

4.4 parts of 5-nitrofuroyl chloride dissolved in 50 parts of diethyl ether are added dropwise with stirring to a solution of 1.4 parts of diazoethane and 2.5 parts of triethylamine in 600 parts of ether which is kept at a temperature not exceeding 0° C. When the addition is complete, the mixture is kept at ambient temperature for 17 hours. The mixture is cooled to 0° C. and then saturated with hydrogen chloride gas. After 4 hours, the solution is extracted with water to remove triethylamine hydrochloride. The ethereal solution is dried over anhydrous sodium sulphate and the ether is removed by distillation. The crude 5-nitro-2-furyl 1-chloroethyl ketone thus obtained is heated under reflux for 1 hour with 2 parts of thiourea and 50 parts of ethanol, and the solution is evaporated to dryness. The residue is dissolved in hot ethanol, and a concentrated aqueous solution of sodium acetate is added until there is no further precipitation of solid material. The mixture is filtered; the solid residue is 2-amino-5-methyl-4-(5-nitro-2-furyl)thiazole, M.P. 260° C.

Example 15

5.2 parts of 94% nitric acid are added cautiously at −5° C. to 17 parts of acetic anhydride. The solution is cooled (temperature kept below 0° C.) and to it is added a solution of 2.3 parts of 4-(2-furyl)-2-(2-pyridyl)thiazole in 10 parts of acetic anhydride. After 30 minutes, the mixture is poured on to 200 parts of ice, and is adjusted to pH 6 by the cautious addition of sodium hydroxide solution. The mixture is filtered, and the solid residue is washed with water, and then suspended in a mixture of 200 parts of diethyl ether and 10 parts of pyridine. After 4 days, the suspension is filtered. The filtrate is extracted with dilute acetic acid, and then with water. The ethereal solution is dried over anhydrous sodium sulphate, and evaporated to dryness. The residue is crystallised from ethanol giving 4-(5-nitro-2-furyl)-2-(3-pyridyl)thiazole, M.P. 174° C.

The 4-(2-furyl)-2-(3-pyridyl)thiazole used as starting material may be obtained as follows:

20 parts of thionicotinamide, 21 parts of 2-chloroacetylfuran and 250 parts of ethanol are heated under reflux for 2 hours. The mixture is evaporated to ⅓ of its volume, then cooled and filtered. The filtrate is made alkaline with ammonia, and then evaporated to dryness. The residue is dissolved in benzene and is purified by chromatography on alumina. There is thus obtained 4-(2-furyl)-2-(3-pyridyl)thiazole, M.P. 84–86° C.

What I claim is:

1. A thiazole derivative of the formula:

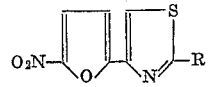

wherein R is selected from the group consisting of 2-pyridyl, 3-pyridyl, 4-pyridyl, alkylpyridyl wherein the alkyl is of not more than 5 carbon atoms, dialkylpyridyl wherein each alkyl is of not more than 5 carbon atoms, halogenopyridyl, and hydroxy-(alkyl)pyridyl wherein the alkyl is of not more than 5 carbon atoms.

2. 4-(5-nitro-2-furyl)-2-(3-pyridyl)thiazole.

References Cited in the file of this patent

UNITED STATES PATENTS

| | | |
|---|---|---|
| 2,481,673 | Knott et al. | Sept. 13, 1949 |
| 2,992,225 | Dickson | July 11, 1961 |

OTHER REFERENCES

Rinkes: Rev. Trav. Chim., volume 51, pp. 349–55 (1932).

De la Mare et al.: "Aromatic Substitution-Nitration-Halogenation," pp. 51–53 (1959) (Academic Press).